(12) United States Patent
Chang et al.

(10) Patent No.: US 9,169,850 B2
(45) Date of Patent: Oct. 27, 2015

(54) FAN

(71) Applicant: DELTA ELECTRONICS, INC., Kuei San, Taoyuan Hsien (TW)

(72) Inventors: Shun-Chen Chang, Taoyuan Hsien (TW); Bo-Chun Chen, Taoyuan Hsien (TW); Chao-Yu Chen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 322 days.

(21) Appl. No.: 13/781,132

(22) Filed: Feb. 28, 2013

(65) Prior Publication Data

US 2014/0079577 A1 Mar. 20, 2014

(30) Foreign Application Priority Data

Sep. 18, 2012 (TW) .............................. 101134116 A

(51) Int. Cl.
*F04D 25/08* (2006.01)
*F04D 29/08* (2006.01)
*F04D 29/32* (2006.01)
*F04D 29/40* (2006.01)
*F04D 29/58* (2006.01)
*F04D 25/06* (2006.01)
*H02K 9/06* (2006.01)

(52) U.S. Cl.
CPC ............ *F04D 29/403* (2013.01); *F04D 25/064* (2013.01); *F04D 25/082* (2013.01); *F04D 29/083* (2013.01); *F04D 29/5853* (2013.01); *F04D 29/329* (2013.01); *H02K 9/06* (2013.01)

(58) Field of Classification Search
CPC .............. F04D 25/0613; F04D 25/064; F04D 25/0646; F04D 25/082; F04D 29/329
USPC ............ 417/423.7, 423.8, 423.9, 423.14, 354
See application file for complete search history.

(56) References Cited

U.S. PATENT DOCUMENTS

| | | | | |
|---|---|---|---|---|
| 3,303,995 | A | * | 2/1967 | Boeckel ........................ 417/353 |
| 5,071,322 | A | * | 12/1991 | Maekawa ................... 417/423.7 |
| 2008/0219845 | A1 | * | 9/2008 | Chen et al. ...................... 416/95 |

FOREIGN PATENT DOCUMENTS

| | | |
|---|---|---|
| JP | 4822021 B2 | 9/2011 |
| TW | M313414 U | 6/2007 |
| TW | 201108924 A1 | 3/2011 |

* cited by examiner

*Primary Examiner* — Peter J Bertheaud
(74) *Attorney, Agent, or Firm* — Muncy, Geissler, Olds & Lowe, P.C.

(57) ABSTRACT

A fan includes a fan frame, a motor and an impeller. The motor is disposed in the frame. The impeller is connected with the motor and driven by the motor. The impeller includes a hub, an inner blade and an outer blade. The hub has a first surface facing the motor and a second surface facing away from the motor. The inner blade is disposed on the first surface, and the outer blade is disposed on the second surface.

15 Claims, 4 Drawing Sheets

FAN

CROSS REFERENCE TO RELATED APPLICATIONS

This Non-provisional application claims priority under 35 U.S.C. §119(a) on Patent Application No(s). 101134116 filed in Taiwan, Republic of China on Sep. 18, 2012, the entire contents of which are hereby incorporated by reference.

BACKGROUND OF THE INVENTION

1. Field of Invention

The invention relates to a fan and, in particular, to a waterproof fan.

2. Related Art

For a conventional fan, the adhesive material is usually used to cover and seal the components disposed in the fan to protect them, thereby achieving the waterproof function. FIG. 1 is a sectional side-view diagram of a conventional fan with the waterproof function. Referring to FIG. 1, the fan 1 includes an adhesive 11, a casing 12, a plurality of outer blades 13, a fan frame 14, a circuit board 15 and a stator structure 16. The adhesive 11 is disposed to cover the circuit board 15 and the stator structure 16, and the outer blades 13 are connected onto the outer surface of the casing 12 and disposed in the fan frame 14.

Accordingly, a great quantity of adhesive 11 needs to be used to fill in for protecting the components, thus not only increasing the production cost and time, but also causing the pollution to the environment. Besides, because the adhesive 11 completely seals or covers the circuit board 15, the heat generated by the circuit board 15 is not easily dissipated, thus causing the overheated circuit board 15 to be burned out and considerably decreasing the operation efficiency of the fan. In addition, the electronic components of the circuit board 15 may be damaged due to the high temperature or internal stress generated during the process of solidifying the adhesive.

Therefore, it is an important subject to provide a fan that has a waterproof function and higher heat-dissipation capacity so as to enhance the efficiency of the fan and the motor.

SUMMARY OF THE INVENTION

In view of the foregoing subject, an objective of the invention is to provide a fan in which air flowing is enhanced so as to lower down the temperatures of the motor and the electronic components and thus enhance the fan's inside heat-dissipation efficiency.

Another objective of the invention is to provide a fan having waterproof and dust-proof functions for preventing the outside moisture and dust from entering the motor so as to maintain the fan's efficiency.

To achieve the above objectives, a fan of the invention comprises a fan frame, a motor and an impeller. The motor is disposed in the fan frame. The impeller is connected with the motor and driven by the motor, and comprises a hub, an inner blade and an outer blade. The hub includes a first surface facing the motor and a second surface facing away from the motor. The inner blade is disposed onto the first surface, and the outer blade is disposed onto the second surface.

To achieve the above objectives, a fan of the invention comprises a fan frame, a heat-guiding shell, a motor and a plurality of heat-dissipation sheets. The heat-guiding shell is connected with the fan frame. The motor is disposed in the heat-guiding shell. The impeller is disposed around the heat-guiding shell, and connected with the motor and driven by the motor. The heat-dissipation sheets contact the heat-guiding shell and are disposed between the heat-guiding shell and the impeller.

To achieve the above objectives, a fan of the invention comprises a fan frame, a heat-guiding shell, a motor and an impeller. The heat-guiding shell is connected with the fan frame, and a surface of the heat-guiding shell has a first structure including at least one first protrusion. The motor is disposed in the heat-guiding shell. The impeller is disposed around the heat-guiding shell, and includes at least one hub including a second structure. The second structure includes at least one second protrusion, and the first and second protrusions are staggered in a first direction and overlapped in a second direction.

As mentioned above, the fan of the invention includes at least one inner blade and outer blades, and the inner blade is disposed on the first surface of the hub facing the motor while the outer blade is disposed on the second surface of the hub facing away from the motor. Because the inner blade is disposed facing the motor, the air flowing effect inside the fan can be enhanced so as to help the heat dissipation of the motor and the air discharge. Accordingly, the temperature of the motor and the inside electronic components is lowered down. Besides, by disposing the heat-dissipation sheets contacting the heat-guiding shell, the heat inside the motor can be dissipated through the conduction and convection. Furthermore, the first structure disposed on a surface of the heat-guiding shell and the second structure disposed on the first surface of the hub are disposed oppositely, and the first and second structures are staggered in the radial direction and overlapped axially, so that moisture and dust are difficult to enter the motor's inside so as to achieve the waterproof and dust-proof functions.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
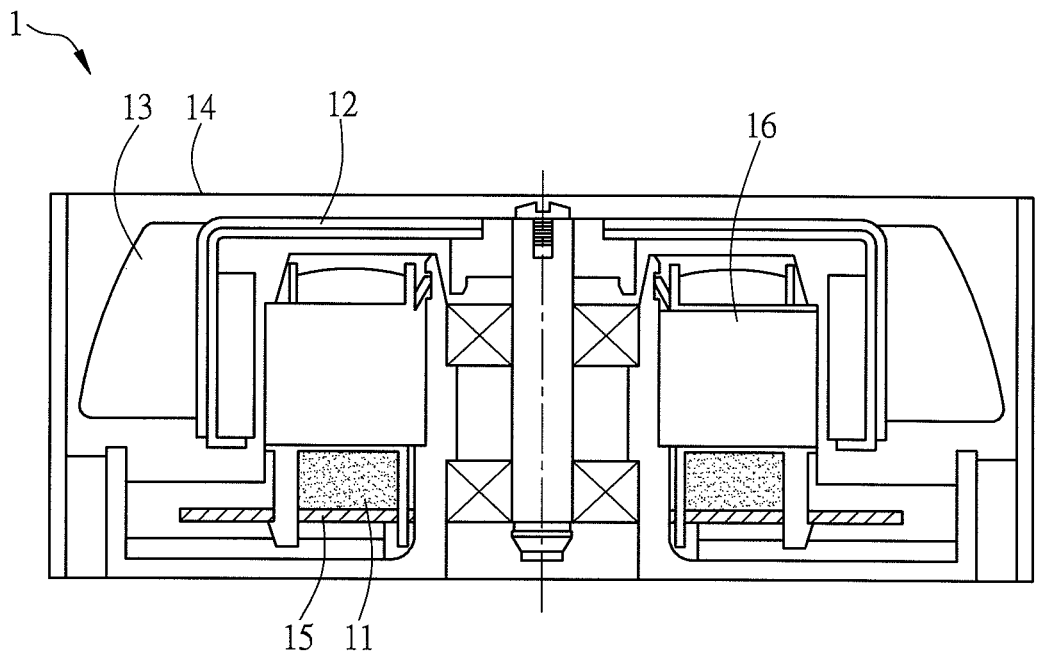
FIG. 1 is a sectional side-view diagram of a conventional fan.
Figure 2A:
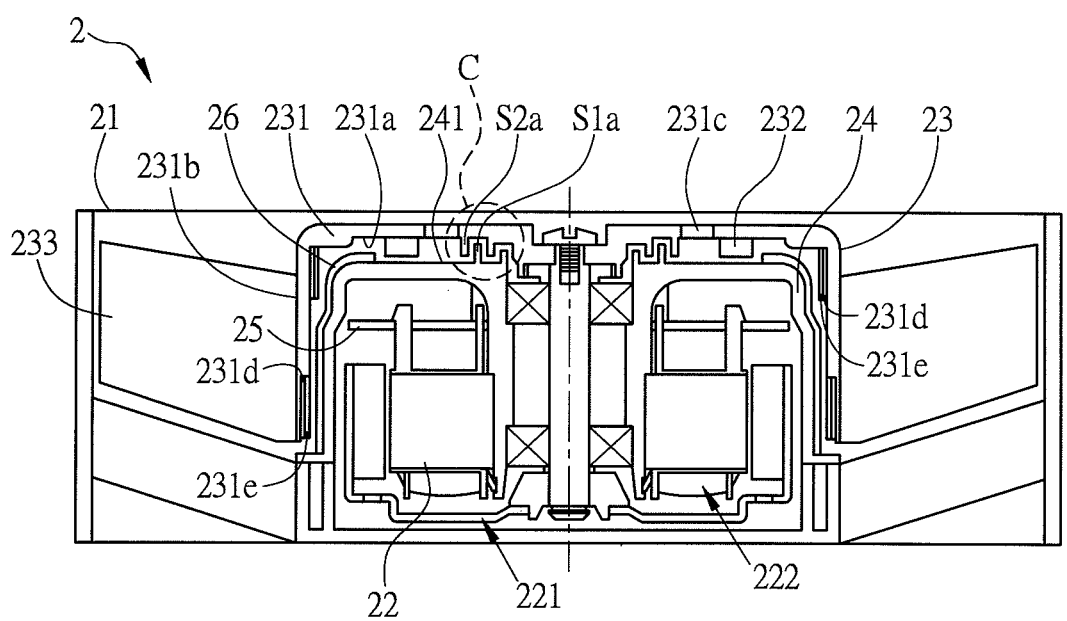
FIG. 2A is a schematic sectional diagram of a fan of a preferred embodiment of the invention.

FIG. 2A is a schematic sectional diagram of a fan of a preferred embodiment of the invention. Referring to FIG. 2A, the fan 2 includes a fan frame 21, a motor 22 and an impeller 23. The motor 22 is disposed in the fan frame 21. The impeller 23 is connected with the motor 22 and driven by the motor 22. The fan 2 of the invention is, for example, a waterproof fan, suitable for the damp environment. The motor 22 can be assembled rightly or inversely. In this embodiment, since the circuit board 25 is disposed above the motor 22, the motor 22 is inversely assembled for example.

The impeller 23 includes a hub 231 and an outer blade 233. The hub 231 covers the motor 22, and has a first surface 231a and a second surface 231b opposite to the first surface 231a. The first surface 231a faces the motor 22, and that also indicates the first surface 231a faces the inside of the fan 2. The second surface 231b faces away from the motor 22, and that also indicates the second surface 231b faces the outside of the fan 2.

The impeller 23 can further include an inner blade 232 according to the requirements. The inner blade 232 is disposed on the first surface 231a, and the outer blade 233 is disposed on the second surface 231b. The blade form of the inner blade 232 is a streamline form, a curvy form, or a flat form. By the inner blade 232 disposed on the first surface 231a of the hub 231, the inside air flowing of the hub 231 is increased, thereby considerably dissipating the heat of the motor 22 and driving the air flowing out of the bottom side of the fan 2 so as to decrease the temperatures of the motor 22 and the inner electronic components.

The fan 2 can further include a heat-guiding shell 24 according to the requirements. The heat-guiding shell 24 is connected with the fan frame 21, and the impeller 23 is disposed around the heat-guiding shell 24 and connected with the motor 22. The heat-guiding shell 24 is connected with the fan frame 21 by locking, embedding, etc. The material of the heat-guiding shell 24 can have higher thermal conductivity or the thermal conductivity higher than the frame 21. For example, gold, silver, copper and aluminum are all the metals with thermal conductivities higher than plastics. By the heat-guiding shell 24, the heat generated by the motor 22 can be easily dissipated so as to increase the lifespan and efficiency of the motor 22 and the fan 2.

More specifically, the motor 22 can further include a rotor structure 221 and a stator structure 222. The rotor structure 221 is disposed corresponding to the stator structure 222, and around the stator structure 222. The rotor structure 221 and the stator structure 222 are both disposed in the heat-guiding shell 24.

Besides, for the fan 2, one or more heat-dissipation sheets can be disposed on the surface of the heat-guiding shell 24 for further enhancing the heat-dissipation efficiency of the heat-guiding shell 24. In this embodiment, the heat-dissipation sheets 26 contact the heat-guiding shell 24, and are evenly spaced on the surface of the heat-guiding shell 24 and disposed between the heat-guiding shell 24 and the impeller 23. Hence, the heat-dissipation efficiency of the heat-guiding shell 24 can be greatly enhanced by the heat-dissipation sheets through the heat conduction and convection to the inside of the motor 22 and the heat-guiding shell 24. Thereby, the lifespan and efficiency of the motor 22 and the fan 2 can be increased.

Figure 2B:
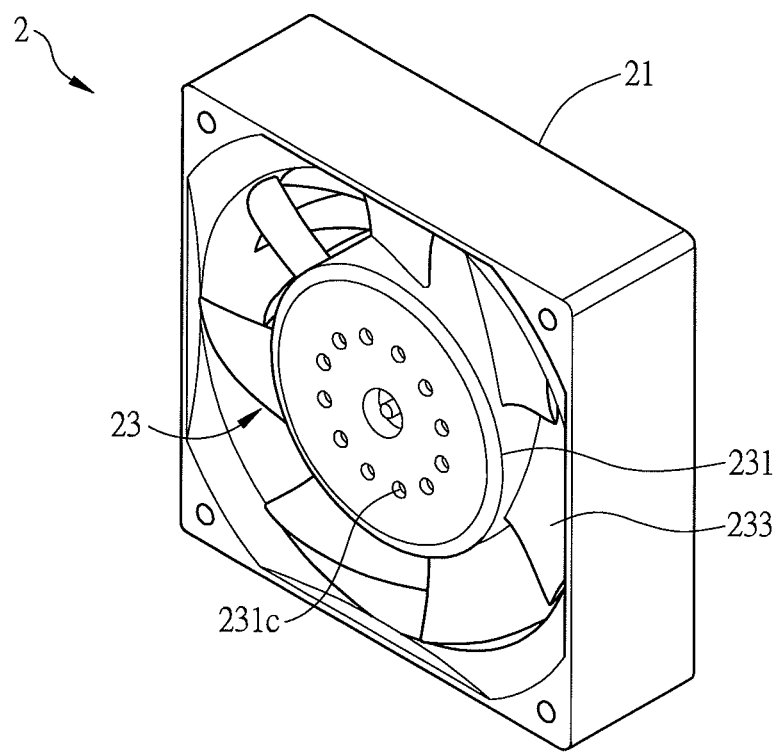
FIG. 2B is a perspective view of the fan as shown in FIG. 2A.

FIG. 2B is a perspective view of the fan as shown in FIG. 2A. The hub 231 can have at least one hole 231c according to the requirements. The hole 231c is through the hub 231 to connect the outside and the inside of the hub 231. Therefore, the air from the outside can flow into the inside of the hub 231 through the hole 231c, and then flows out of the fan 2, so as to dissipate the heat of the motor 22 or the heat-guiding shell 24. Accordingly, the temperature of the inside of the hub 231 or the heat-guiding shell 24 is lowered down so that the lifespan and efficiency of the motor 22 and the fan 2 can be enhanced.

When the hub 231 includes the hole 231c and the impeller 23 includes the inner blade 232, the speed of the air flowing into the hole 231c and out of the fan 2 can be further increased, thereby further enhancing the efficiency of the motor 22 and the fan 2.

Besides, the hub 231 can include at least one balance clip 231e, which is disposed on the first surface 231a. By the disposition of the balance clip 231e, the vibration of the impeller 23 caused by the unbalanced effect can be reduced a lot, thereby enhancing the lifespan and efficiency of the motor 22 and the fan 2.

Besides, the hub 231 can include at least one recess 231d, which is disposed on the first surface 231a, and the said balance clip 231e can be disposed to the recess 231d for saving the disposition space. For the convenient illustration, a plurality of balance clips 231e in the embodiment as shown in FIG. 2A are disposed on the first surface 231 and/or in the recesses 231d respectively, but such structure design is just for example and not for limiting the scope of the invention. The recesses 231d are evenly spaced with each other, preferably.

Referring to FIG. 2A, the fan 2 can include a first structure S1a disposed on a surface 241 of the heat-guiding shell 24, and include a second structure S2a disposed on the first surface 231a of the hub 231. The second structure S2a is disposed opposite to the first structure S1a, and they are staggered in the radial direction and overlapped in the axial direction. Accordingly, the fan 2 can possess the stronger waterproof and dust-proof functions so that the fan 2 can be more suitable for any environment and have the enhanced lifespan and efficiency.

Figure 3:
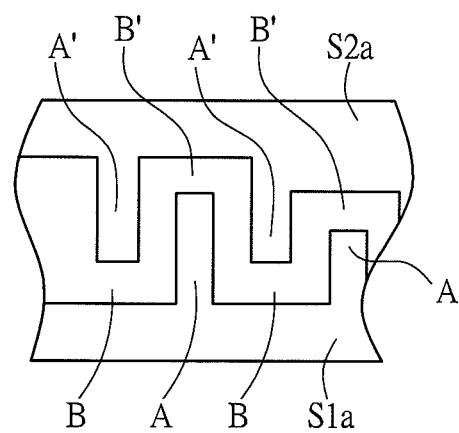
FIG. 3 is an enlarged diagram of the portion bounded by a dotted circle in FIG. 2A.

FIG. 3 is an enlarged diagram of the portion bounded by a dotted circle in FIG. 2A. Referring to FIG. 3, the first structure S1a includes at least one first protrusion A, and the second structure S2a includes at least one second protrusion A'. The first and second protrusions A and A' are staggered in a first direction (such as a radial direction), and overlapped in a second direction (such as an axial direction), for forming a gap that brings ventilative, waterproof and dust-proof functions. The first and second protrusions A and A' can have the same or different lengths, widths, or shapes. Besides, there can be one or more first protrusions or second protrusions.

Besides, the first structure S1a can include at least one first protrusion A and at least one first indentation B, and the second structure S2a can include at least one second indentation B' and at least one second protrusion A'. The first indentation B and the second protrusion A' are disposed facing each other while the first protrusion A and the second indentation B' are disposed facing each other, so that the first structure S1a and the second structure S2a are disposed staggered with each other. Such special design can prevent moisture and dust from entering the inside, thereby achieving the waterproof and dust-proof functions. The first protrusion A and the first indentation B (or the second indentation B' and the second protrusion A') can be varied in width, height or form according to the requirements.

Figure 4A:
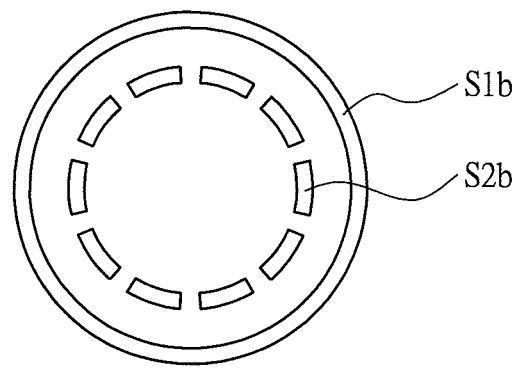
FIGS. 4A to 4D are schematic diagrams of illustrative varieties of the first and second structures of the invention.
Figure 4B:
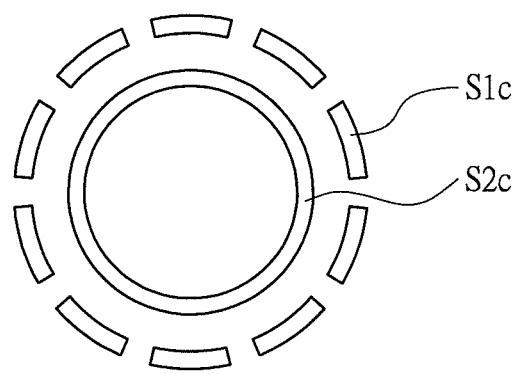
Figure 4C:
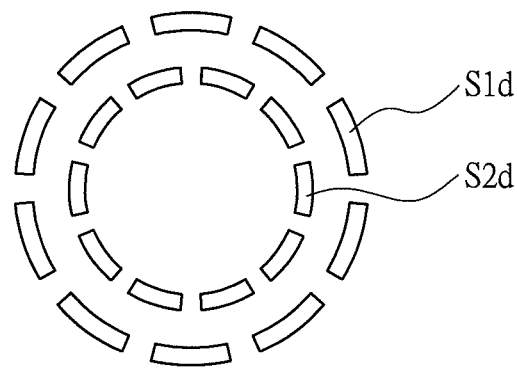
Figure 4D:
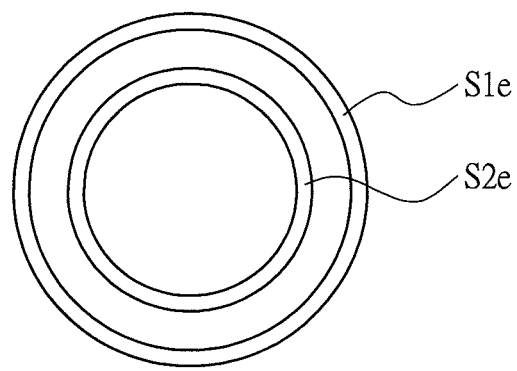

FIGS. 4A to 4D are schematic diagrams of illustrative varieties of the first and second structures of the invention, and the first and second structures can be formed into any variety according to the requirements. In FIG. 4A, the first structure S1b is an unbroken annular form and the second structure S2b is a broken annular form. In FIG. 4B, the first structure S1c is a broken annular form and the second structure S2c is an unbroken annular form. In FIG. 4C, the first and second structures S1d and S2d are both broken annular forms, and the interval portion of the first structure S1d is disposed corresponding to the substantial portion of the second structure S2d in the radial direction of the fan 2 while the substantial portion of the first structure S1d is disposed corresponding to the interval portion of the second structure S2d in the radial direction of the fan 2. In FIG. 4D, the first and second structures S1e and S2e are both unbroken annular forms.

To be noted, the invention is illustrated as the first structure is disposed outward while the second structure is disposed inward, but however, the first structure can be disposed inward while the second structure is disposed outward according to the requirements.

To deserve to be mentioned, in other embodiments, the respective features of the all above embodiments can be combined desirably according to the practical requirements for achieving different effects.

In summary, the fan of the invention includes at least one inner blade and outer blades, and the inner blade is disposed on the first surface of the hub facing the motor while the outer blade is disposed on the second surface of the hub facing away from the motor. Because the inner blade is disposed facing the motor, the air flowing effect inside the fan can be enhanced to help the heat dissipation of the motor and the air discharge. Accordingly, the temperature of the motor and the inside electronic components is lowered down, and thus the lifespan and efficiency of the motor and the fan are increased.

Besides, by the disposition of the heat-guiding shell, the holes and even the heat-dissipation sheets, the temperature of the hub's inside and the heat-guiding shell can be lowered down so as to enhance the lifespan and efficiency of the motor and the fan.

Furthermore, the first structure disposed on a surface of the heat-guiding shell and the second structure disposed on the first surface of the hub are disposed oppositely, and the first and second structures are staggered in the radial direction and overlapped axially, so that outside moisture and dust are difficult to enter the motor's inside. Accordingly, moisture and dust are prevented from entering so that the fan can be suitably applied to any environment with the longer lifespan and enhanced efficiency. Besides, the material of the heat-guiding shell is the metal of higher thermal conductivity (e.g. higher than the plastics' thermal conductivity) so the heat of the motor can be dissipated through the conduction.

In addition, by the disposition of the balance clip, the vibration caused by the unbalanced blades can be reduced a lot, thereby enhancing the lifespan and efficiency of the motor and the fan.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan, comprising:
   a fan frame;
   a motor disposed in the fan frame;
   an impeller connected with the motor and driven by the motor, and comprising:
   a hub including a first surface facing the motor and a second surface facing away from the motor;
   an inner blade disposed on the first surface;
   an outer blade disposed on the second surface; and
   a heat-guiding shell connected with the fan frame, wherein a surface of the heat-guiding shell has a first structure including concentric first protrusions; wherein the impeller is disposed around the heat-guiding shell and includes a second structure, wherein the second structure includes concentric second protrusions; and
   wherein the first protrusions are staggered with respect to the second protrusions in a radial direction and overlap with each of the second protrusions in an axial direction.

2. The fan as recited in claim 1, wherein the motor includes a shaft, and the impeller includes at least one hole and an inner blade, wherein the hole is disposed between the shaft and the inner blade.

3. The fan as recited in claim 1, wherein the hub further includes at least one hole, at least one balance clip, or at least one recess.

4. The fan as recited in claim 1, further comprising:
   a heat-guiding shell connected with the fan frame; and
   at least one heat-dissipation sheet contacting the heat-guiding shell and disposed between the heat-guiding shell and the impeller.

5. The fan as recited in claim 4, wherein the material of the heat-guiding shell is the metal having a high thermal conductivity.

6. The fan as recited in claim 4, wherein the heat-guiding shell is connected with the fan frame by locking or embedding.

7. A fan, comprising:
   a fan frame;
   a heat-guiding shell connected with the fan frame, wherein a surface of the heat-guiding shell has a first structure including concentric first protrusions;
   a motor disposed in the heat-guiding shell;
   an impeller disposed around the heat-guiding shell;
   the impeller being connected with and driven by the motor and including at least one hub including a second structure, wherein the second structure includes concentric second protrusions;
   wherein the first protrusions are staggered with respect to the second protrusions in a radial direction and overlap with each of the second protrusions in an axial direction; and
   a plurality of heat-dissipation sheets contacting the heat-guiding shell and disposed between the heat-guiding shell and the impeller.

8. The fan as recited in claim 7, wherein the impeller comprises:
   a hub including at least one hole, at least one balance clip, or at least one recess; and
   a blade disposed to the hub.

9. The fan as recited in claim 7, wherein the material of the heat-guiding shell is the metal having a high thermal conductivity.

10. The fan as recited in claim 7, wherein the heat-guiding shell is connected with the fan frame by locking or embedding.

11. The fan as recited in claim 7, wherein the motor includes a shaft, and the impeller includes at least one hole and an inner blade, wherein the hole is disposed between the shaft and the inner blade.

12. A fan, comprising:
   a fan frame;
   a heat-guiding shell connected with the fan frame, wherein a surface of the heat-guiding shell has a first structure including concentric first protrusions;
   a motor disposed in the heat-guiding shell; and
   an impeller disposed around the heat-guiding shell and including at least one hub including a second structure, wherein the second structure includes concentric second protrusions; and
   wherein the first protrusions are staggered with respect to the second protrusions in a radial direction and overlap with each of the second protrusions in an axial direction.

13. The fan as recited in claim 12, wherein the material of the heat-guiding shell is the metal having a high thermal conductivity.

14. The fan as recited in claim 12, wherein the heat-guiding shell is connected with the fan frame by locking or embedding.

15. The fan as recited in claim 12, wherein the motor includes a shaft, and the impeller includes at least one hole and an inner blade, wherein the hole is disposed between the shaft and the inner blade.

* * * * *